United States Patent [19]
Konrad

[11] 3,803,472
[45] Apr. 9, 1974

[54] CONTROLLED VARIABLE TIME RATIO CONTROL CIRCUIT

[75] Inventor: Charles E. Konrad, Roanoke, Va.

[73] Assignee: General Electric Company, Salem, Va.

[22] Filed: Dec. 29, 1972

[21] Appl. No.: 319,526

[52] U.S. Cl................. 318/341, 318/318, 318/345, 321/45 C
[51] Int. Cl. ............................................ H02p 5/16
[58] Field of Search................... 318/341, 345, 318; 321/45 C

[56] References Cited
UNITED STATES PATENTS

| | | | |
|---|---|---|---|
| 3,624,474 | 11/1971 | Nolf | 318/341 X |
| 3,624,475 | 11/1971 | Smith | 318/341 |
| 3,708,765 | 1/1972 | Salamon | 318/341 X |
| 3,719,876 | 3/1973 | Miller | 321/45 C |

Primary Examiner—B. Dobeck
Attorney, Agent, or Firm—Frederick W. Powers; Harold H. Green, Jr.

[57] ABSTRACT

An oscillator circuit having a variable mark-space ratio is provided through the selective variation of both the pulse width and the interpulse spacing. This oscillator circuit is particularly suited to the control of d.c. chopper circuits employing semiconductor switching devices for the controlled application of variable power to a load, for example a motor.

13 Claims, 6 Drawing Figures

CONTROLLED VARIABLE TIME RATIO CONTROL CIRCUIT

BACKGROUND OF THE INVENTION

The present invention relates generally to an oscillator circuit with a square wave output which alternates between two states. In oscillators of this type, considerable emphasis has been placed on the generation of a symmetrical output waveform, that is, an output waveform in which the time interval in one state is equal to one-half period of the output frequency. The ratio of the time interval in one state to a period of the output frequency is defined as the mark-space ratio, which is 0.5 for a symmetrical waveform. The present invention relates more particularly to an oscillator circuit wherein the mark-space ratio may be selectively varied and may be employed in conjunction with a control circuit for varying the effective power of a direct current source to an appropriate load and still more particularly to an oscillator for use in a control circuit which varies the effective power to a series direct current load through the control of the percentage of time during which the load and source are connected together. This may be achieved by varying the frequency of the voltage pulses supplied to the load, by varying the width of the voltage pulses or by some combination of these methods.

It is known in the prior art that the amount of power which can be supplied to a load, such as a direct current motor, from a substantially constant direct current voltage source may be varied by connecting and disconnecting the load to and from the source. The effective amount of power supplied to the load will vary in accordance with the percentage of time that the load and the source are connected. It is also known in the prior art to use a solid-state switching device, which may be switched at a selected frequency to provide this varying amount of power. The solid-state switching devices most often used in applications of this nature are those known as thyristors; the most common of which is a silicon controlled rectifier described in "SCR Manual, 4th Edition" by General Electric Company, copyright 1967 by General Electric Company. Circuits of this nature generally employ a first thyristor which is rendered conductive by the simultaneous application of a forward voltage bias and a gating signal to connect the load to a power source. Once conduction is established, the gating signal may be removed and conduction will continue until a zero or negative bias is applied to the thyristor terminals. The negative bias is obtained by providing a gating signal to a second thyristor which connects a reversely charged capacitor across the first thyristor. The gating signals for the two thyristors are supplied by an oscillator circuit which thereby controls the mark-space ratio and the frequency of the power pulses supplied to the load.

One example of the motor control circuit embodying the type of control just described is found in U. S. Pat. No. 3,335,351, "DC Motor Control Circuit," by H. E. Morris and assigned to the assignee of the present invention. This control is highly typical of that presently in use for many electric vehicles and is for the most part, quite satisfactory, particularly when compared to previous methods utilizing variable resistors in that the large bulk of the power consumed is within the motor itself and not dissipated in a large resistor bank. It is, however, to be realized that in controls of this type with which we are here concerned the conservation of even small amounts of energy is highly important. This is particularly true in the case of electric vehicles where the sole source of energy consists of storage batteries carried by the vehicle itself. It should also be noted that the heating effect of losses within the solid-state components and the load may restrict the maximum power capability. In this particular application it is, therefore, highly desirable that losses attributable to various circuit components be held to an absolute minimum.

When the load of the control circuit is a motor, it is known in the prior art to provide a suitable braking by a system normally termed dynamic braking. This amounts to the reversal of the relative current directions in the armature and field of the motor such that when the motor is in a coasting condition the motor acts as a generator with the polarity reversed. A diode short circuiting the armature allows the generated voltage to be dropped across the armature producing the dynamic braking effect. A diode short circuiting the series combination of the armature and field serves to maintain the flow of current through the motor during the interpulse periods and thereby reduce the motor ripple current. A system such as has just been described is shown in U.S. Pat. No. 3,344,328, "Direct Current Motor Plugging Circuit," by H. E. Morris, assigned to the assignee of the present invention. In a limited number of situations this system presents certain erraticisms during braking in that the motor becomes a self-excited generator producing a maximum braking effort. Under the conditions of self-excitation the maximum armature current occurs at the most rapid speed and the combination of high speed and high current can result in motor brush arcing as well as wheel slippage and jerk when braking is initiated. It has been found that this problem can be eliminated by suitable restrictions on the pulse width of the applied voltage.

SUMMARY OF THE INVENTION

The foregoing deficiencies of the prior art are alleviated by the present invention which provides an oscillator circuit with a square wave output signal wherein the main switching device of the power circuit is conductive when the oscillator output state is a binary "one," and non-conductive when the oscillator state is a binary "zero." The ratio of the time spent in the "one" state to the time of a single period is termed the mark-space ratio and is a linear function of the oscillator input voltage. The conductive period or pulse width and the non-conductive period or interpulse period are both controlled by the oscillator input voltage. In motor applications, for mark-space ratios less than 0.5 the pulse width is maintained at a value short enough to prevent self-excitation during braking, while the interpulse period can be varied widely to control the mean power supplied to a load and in this region the oscillator reacts like a variable frequency control. When the mark-space ratio exceeds 0.5, the interpulse period is maintained short and the pulse width is increased resulting in a control which reacts like a variable pulse width with constant frequency. The pulse frequency is a maximum when the mark-space ratio is 0.5 and decreases with ratios both above and below this point. With this scheme, the pulse width can be short during braking and light torque operation, and yet mark-space ratios approaching unity can be obtained without excessive switching frequencies which would lead to increased circuit losses. This function is obtained in the present invention by providing an oscillator circuit in which the pulse width is a monotonically increasing function of the required mark-space ratio while the interpulse period is a monotonically decreasing function of the mark-space ratio. By properly selecting the interrelationship between the pulse width and the interpulse period the oscillator output frequency will increase monotonically from approximately zero to a prescribed value after which the frequency will decrease in the same manner to approximately zero.

It is, therefore, an object of this invention to provide a new and improved oscillator circuit with a controllable mark-space ratio.

A further object of the invention is to provide an oscillator particularly suited to time-ratio control circuits wherein the pulse width is increased and the interpulse period decreased to obtain an increasing mark-space ratio.

A still further object of the invention is to provide a new and improved oscillator for the time-ratio control of power supplied to d.c. motors wherein the pulse width is controlled in a manner which minimizes the power losses by reducing the switching frequency only when the reduction in frequency will not result in excessive ripple currents in the load.

DESCRIPTION OF THE DRAWINGS

The foregoing and other objects of the present invention will become apparent as the following description proceeds and features of novelty which characterize the invention will be pointed out in particularity in the claims affixed to and forming a part of this specification. For a better understanding of this invention, reference is made to the accompanying drawings in which:

DETAILED DESCRIPTION

Figure 1:
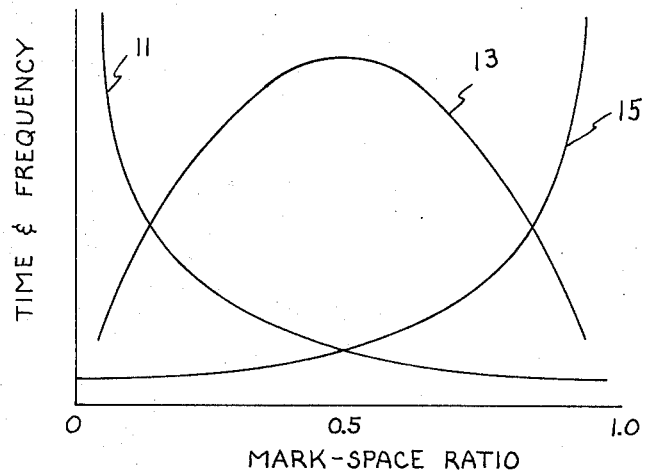
FIG. 1 illustrates the relationship between the pulse width, the interpulse period, the frequency, and the mark-space ratio of the oscillator of the present invention.

In association with the present invention it has been found through the application of time ratio techniques to the control of traction drives for electric vehicles that the mark-space ratio required for a given driving condition tends to repeat over the range of motor design. The mark-space ratio necessary for creep speed is 0.1, the ratio required for smooth braking is in the range of 0.01 to 0.05, and the electronic control will reach its maximum current rating with a stalled motor when the mark-space ratio is in the range of 0.3 to 0.5.

As the drive accelerates, the generated counter electromotive force opposes the current flow necessitating an increasing mark-space ratio to maintain the current level at the control limit. The maximum vehicle speed is directly related to the maximum available voltage applied to the motor, hence a mark-space ratio approaching unity is necessary to obtain maximum speed.

A second control variable which directly influences the control effectiveness is the pulse width of the applied pulses. It has been found that limits can be established for the pulse width for a given driving condition, and these limits are valid over the complete range of motor designs. For example, it has also been found that a pulse width or duration which is less than one millisecond during braking will prevent a condition of self-excitation which leads to brush arcing and jerky deceleration. A maximum pulse width of one millisecond is desirable for creep operation to maintain the pulse frequency high enough to eliminate gear rattle in the drive train. When the control reaches a maximum current limit with the motor stalled, the maximum pulse width should not exceed two milliseconds to prevent the motor current ripple from being excessive. In top speed operation, the pulse width should exceed 10 milliseconds to minimize the operating frequency and hence the power losses within the electronic power switching components.

As previously stated, it has been conventional in the design of oscillators for time ratio control to either select a fixed pulse width and vary the frequency to obtain the required mark-space ratio, or to select a frequency and vary the pulse width to achieve the necessary mark-space ratio. It is obvious in the foregoing discussion that neither of these two schemes can provide all of the desirable characteristics. For example, if the pulse width is chosen as one millisecond to provide smooth braking and creep operation, then an excessively high frequency is required for the mark-space ratio to approach unity for maximum top speed. Or should one select a suitable low frequency for top speed operation, then vary the pulse width to control the mark-space ratio, the pulse is so long for a mark-space ratio of 0.5 that the motor current ripple is excessive when the drive is operating at maximum current with a stalled drive. A more suitable control is one in which an explicit relationship is established between the pulse width and the mark-space ratio to overcome the problems discussed previously. In the present invention this relationship is established by suitably controlling both the pulse width and the interpulse period in response to an input signal to the oscillator which is linearly related to the desired mark-space ratio.

FIG. 1 depicts the relationship between the interpulse period (curve 11), the pulse width (curve 15) and frequency (curve 13) to the mark-space ratio which is desired to be achieved by the present invention. It can be seen in FIG. 1 that when the mark-space ratio is significantly less than 0.5 the pulse width is small and substantially constant whereas the interpulse period is very long and widely variable. When the mark-space ratio is considerably more than 0.5 the interpulse period is short and substantially constant whereas pulse width 15 is long and widely variable. As shown in FIG. 1, the frequency 13 is low when the mark-space ratio is low and increases to a maximum value for a mark-space ratio of 0.5 and then decreases once again as the mark-space ratio is increased beyond 0.5 reaching a minimum value as the mark-space ratio approaches unity. These characteristics can be expressed mathematically in terms of the control variable (A), the minimum pulse width $T_{min}$, and the maximum frequency $F_{max}$ by the relations:

$$\text{Pulse Width} = 2T_{min}/1 - A$$

$$\text{Interpulse Period} = 2T_{min}/1 + A$$

$$\text{Frequency} = F_{max}/1 - A^2$$

Figure 2:
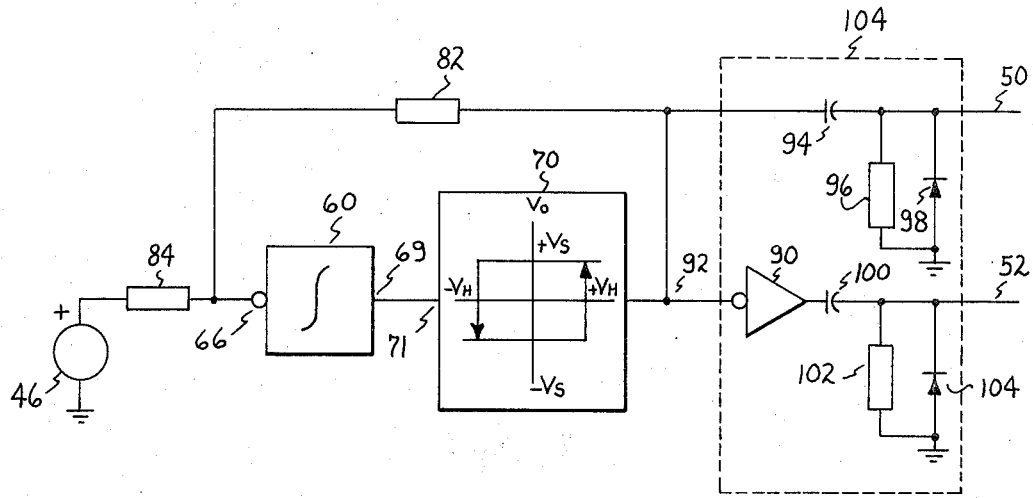
FIG. 2 illustrates a preferred embodiment of the present invention in its fundamental form as suitable for the control of a thyristor power circuit.

The realization of these functions will now be described in detail. Referring now to FIG. 2, an input voltage signal from a source 46 is connected through a resistor 84 to the input terminal 66 of an integrator 60. The output terminal 69 of integrator 60 is connected to an input terminal 71 of a switch 70 which exhibits a hysteresis characteristic. The output terminal 92 of switch 70 is connected through a resistor 82 to the input terminal 66 of the integrator 60.

A pulse forming network 104 is connected to the output terminal 92 of switch 70 to provide a thyristor gating pulse at an output terminal 50 at the network 104 when the signal on the switch output 92 transitions from a negative to a positive state. When the switch 70 output transitions from a positive to a negative output state, a thyristor gating pulse is formed at output terminal 52. The gating pulses at output terminals 50 and 52 respectively may be used for control or other functions; for example, for the control of power circuit components as will be explained with respect to FIG. 6. The input to the pulse forming network 104 is supplied to a capacitor 94 connected in a series relationship with resistor 96. The input is also supplied through an inverter 90 to a capacitor 100 connected in series with a resistor 102. The output 50 is obtained from the junction of capacitor 94 and resistor 96 while the output 52 is obtained from the junction between capacitor 100 and resistor 102. Resistors 96 and 102 are shunted by diodes 98 and 104 respectively to prevent the generation of a negative voltage on the output terminals 50 and 52. The operation of the pulse forming network 104 is simply that of differentiation and is well known in the art.

The operation of the embodiment of FIG. 2 is best understood by considering an operating cycle. Assume that the input voltage from source 46 is zero such that the integrator output 69 is initially at its most positive level ($+V_h$) and the output 92 of switch 70 is in a positive state. The current input to the integrator 60 is then a constant positive value which results in the integrator output decreasing linearly with time until the integrator output reaches the most negative level ($-V_h$). It will be shown later that the time required for the integrator output to move over the voltage span (2 $V_h$) is the product of a constant and the magnitude of current into terminal 66 of the integrator 60. When the integrator output reaches the negative level ($-V_h$), the switch 70 toggles to the negative state, reversing the direction of current input to the integrator. The integrator output then begins to move linearly with time from the voltage ($-V_h$) to the positive trip point ($+V_h$). If the magnitude of the two switching points ($-V_h$, $+V_h$) is the same then the square wave output 92 of the switch 70 will remain for equal periods of time in the positive state and the negative state, and this condition corresponds to a mark-space ratio of 0.5. Now assume that a positive input voltage is applied to resistor 84 which provides a positive component to the input current of the integrator 60. When the switch output at terminal 92 is positive, the current component supplied by the voltage from source 46 will increase the current supplied to the output at 92 through resistor 82, and the time required for the integrator output 69 to move from a voltage ($+V_h$) to the other trip point ($-V_h$) will be lessened and the interpulse period will be reduced. When the trip point ($-V_h$) has been reached, the output of switch 70 assumes a negative voltage and the polarity of current to terminal 66 of integrator 60 is reversed. However, the positive component of current supplied to resistor 84 by the control voltage from 46 reduces the magnitude of the current and, therefore, increases the time required for the output voltage at 69 of the integrator 60 to move from the voltage ($-V_h$) to the positive trip point ($+V_h$). This time increase is reflected as an increase in the width of the output pulses. When the control voltage from source 46 is negative the converse situation occurs; that is, the pulse width is shortened and the interpulse period is lengthened. The relationship between the pulse width, interpulse period, and the mark-space ratio can be more definitively expressed in terms of the components illustrated in the more explicit embodiment of FIG. 3.

Figure 3:
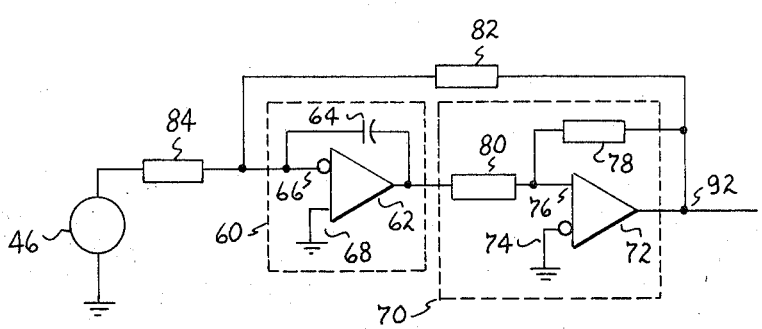
FIG. 3 provides more detail toward implementation of the preferred embodiment.

Referring now to FIG. 3, there is shown one means of achieving the integrating function by connecting a capacitor 64 from the output terminal of an operational amplifier 62 to an inverting input terminal 66 of the same amplifier. The noninverting input 68 of amplifier 62 is connected to ground. The switch 70 utilizes an operational amplifier 72 with positive feedback. The positive feedback is obtained from the junction between two resistors 78 and 80, which form a series circuit connected between the switch output 92 and output of the integrator 60. Inverting input 74 of the amplifier 72 is connected to ground. The arrangement of the integrator 60 and the switch 70 with hysteresis, illustrated in FIG. 3, are well known in the art. The output 92 of the switch 70 will be equal to either the positive supply or the negative supply, and the switching points ($+V_h$, $-V_h$) are determined by the ratio of resistors 78 and 80. It can be shown that the pulse width and the interpulse period are expressable in terms of the resistors 82 and 84, which are equal in magnitude and designated R, the magnitude of the capacitor 64 designated as C, the switching point designated as $V_h$, the supply voltage designated as $V_s$, and a control voltage 46 designated as $V_c$, to wit:

$$\text{Pulse Width} = 2CRV_h/V_s/1 - V_c/V_s$$

$$\text{Interpulse Period} = 2CRV_h/V_s/1 + V_c/V_s$$

These two equations describe the relationships of FIG. 2 which set this oscillator apart from previous designs and characterize its adaptability to time ratio control circuitry.

Figure 4:
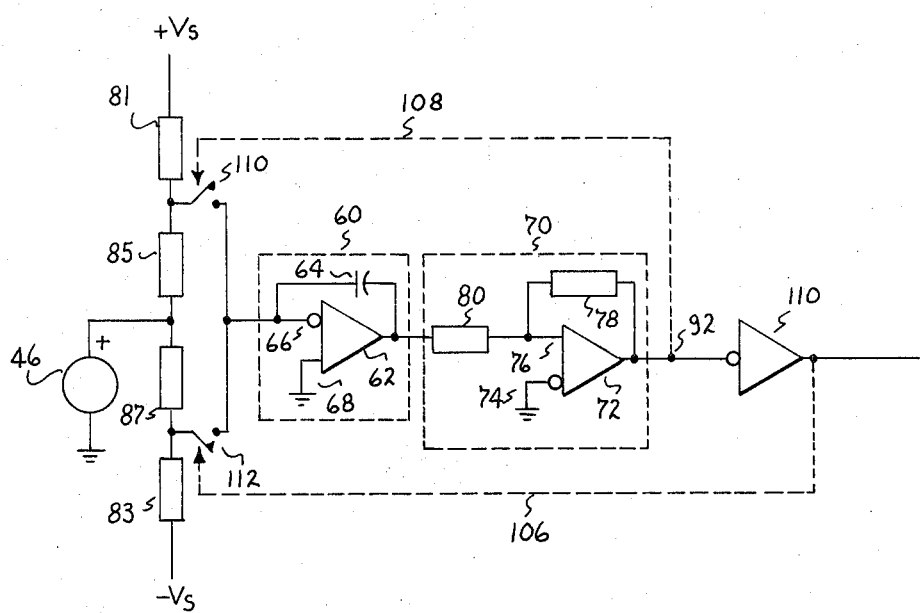
FIG. 4 shows a second embodiment of the present invention incorporating electronic switches.

FIG. 4 shows an alternate embodiment of the invention wherein the feedback mechanism is in the form of electronic switches. A series circuit of resistors comprising resistors 81, 85, 87 and 83 is connected between a positive supply ($+V_s$) to a negative supply ($-V_s$). The control voltage source 46 is connected to the midpoint between resistors 85 and 87. The junction between resistors 81 and 85 is connected through an electronic switch 110 to the input terminal 66 of the integrator 60. In a similar manner, the junction between resistors 87 and 83 is connected through an electronic switch 112 to integrator input 66. The output of the integrator 60 is connected to the input of the electronic switch 70 as described in the embodiment accompanying FIG. 3. The output voltage at terminal 92 of the switch 70 is used through a linkage 108 to close electronic switch 110. The output 92 of electronic switch 70 is also used to supply the input of inverter 110 the output of which is used through a linkage 106 to close switch 112. The electronic switches 110 and 112 and their linkages respectively 108 and 106 can be any one of many electronic switches known in the art of which transmission gates and photocouplers are typical examples. An operating cycle of the embodiment illustrated in FIG. 4 is identical to that described in connection with the embodiment of FIG. 3 with the exception that the sources of feedback current which supply the input to the integrator are derived directly from the positive and negative supplies rather than from the output voltage of a switch 70. The current sources are then selectively switched to the integrator input in response to the output signals of the switch 70 and its inverse, the output of inverter 110.

Figure 5:
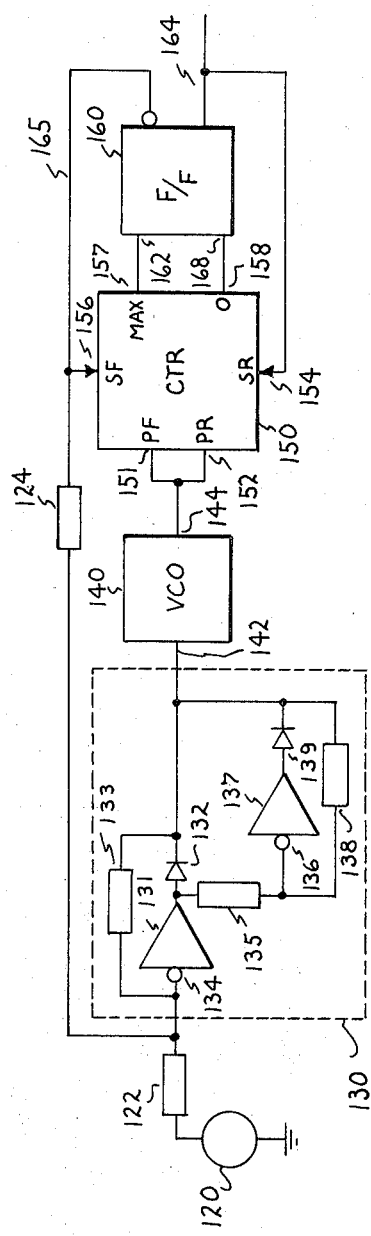
FIG. 5 is a semi-block diagram illustrating the use of digital integration to implement the circuit of the present invention; and, FIG. 6 is a schematic diagram illustrating the means by which the oscillator of the present invention may be interfaced to a time ratio controlled power circuit for electric vehicles to provide an improved vehicle control.

Referring now to FIG. 5, there is shown an embodiment of the invention which uses the properties of a digital counter to implement the integrating function. An absolute magnitude circuit 130, is used in conjunction with a voltage controlled oscillator 140 to provide a pulse rate which linearly related to the current input of the absolute magnitude circuit 130. It will be realized that the function of an absolute magnitude circuit can be constructed in many circuit configurations of which one is shown in the embodiment of FIG. 5. The absolute magnitude circuit has an input which is supplied to an inverting terminal 134 of an operational amplifier 131. The output terminal of the amplifier 131 is connected to the anode of a diode 132 while the cathode of diode 132 is connected to one terminal of a feedback resistor 133. The other terminal of the feedback resistor 133 is connected to the inverting terminal of amplifier 131. The output of amplifier 131 is also connected to a first terminal of resistor 135, the other terminal of which is connected to an inverting input 136 of an amplifier 137. The output of amplifier 137 is connected to the anode of a diode 139, the cathode of which is connected through a feedback resistor 138 to the inverting input 136. The output of the absolute magnitude circuit is at the cathodes of diodes 132 and 139.

The output of the absolute magnitude circuit is supplied to an input 142 of the voltage controlled oscillator 140. The function of the voltage controlled oscillator is to supply a pulse train having a pulse repetition rate linearly related to the input voltage. Circuits of this type are well known in the art; for example, see FIG. 13.63, page 346 of the "Transistor Manual, Seventh Edition," Copyrighted by General Electric Company, 1964.

The pulse output of the voltage controlled oscillator is supplied to a pulse input terminal 152 of a reversing counter 150. This counter is provided with a shift forward terminal 156 and a shift reverse terminal 154 along with pulse forward and pulse reverse terminals 151 and 152 respectively. Terminals 151 and 152 are connected together in this application. If a binary "one" is applied to the shift forward terminal 156, then the pulse train into the pulse terminals 151, 152 will increase the total count. If a binary "one" is applied to the shift reverse terminal 154, the input pulse train will reduce the total count. A counter such as has just been described is shown in U. S. Pat. No. 3,310,749, "Reversing Counter Having Add-And-Subtract Inputs Employing Time-Control Means To Effect Anti-Coincidence Upon Simultaneous Occurrence Of Inputs," by R. C. Clark, assigned to the assignee of the present invention.

The output switching function is accomplished with a bistable flip-flop 160. A set terminal 162 of the flip-flop is connected to terminal 157 of the counter 150 which is at a binary "one" when the counter reaches its maximum count. A clear terminal 166 of the flip-flop is connected to terminal 158 of the counter 150 and is at a binary "one" when the counter is at its minimum count or zero. The normal output 164 of the flip-flop 160 is connected to the shift reverse terminal 154 of counter 150 while the inverse output 165 is connected to the shift forward terminal 156 of counter 150. When the flip-flop 160 is in the cleared state, the inverse output terminal 165 will be a binary one, which in this system is represented by a prescribed positive voltage level. Likewise, in the set state, the inverse output will be a binary "zero," represented by a prescribed negative voltage level. The output terminal 165 supplies a positive current proportional to the magnitude of the resistor 124 to the input of the absolute magnitude circuit 130, and the sense of this current is positive when flip-flop 160 is in the clear state and negative when flip-flop 160 is in the set state. A second component of current proportional in magnitude to the input voltage from a source 120 and a resistor 122, is combined with the first component to provide a voltage input to the voltage control oscillator 140 which is proportional to the absolute magnitude of the difference between the control voltage 120, and the absolute magnitude of the appropriate prescribed positive or negative voltage level.

Assume now that the output flip-flop 160 is in a clear state, the initial count of the counter 150 and the magnitude of the control voltage 120 are zero. The counter will be in a shift forward, or count up, state and a pulse input will cause the total count to increase from zero up to the maximum state. At this point, the flip-flop 160 will be set, reversing the polarity of current into the absolute magnitude circuit, and switching the counter to a shift reverse or count down mode. Since the absolute magnitude of the current into the absolute magnitude circuit is unchanged, the pulse rate output of the phase control oscillator 140 will remain constant, and the counter will progress downward at the same rate that was counted upward, until a count of zero is reached. At this point the output flip-flop 120 will be cleared, the current input to the absolute magnitude circuit will again be switched in polarity and the cycle repeats. It can be seen that the time interval in which the output flip-flop is in the one state depends upon the pulse rate output of the voltage controlled oscillator 140 while the counting direction is upward, and conversely the output remains in the zero state while the counter is in a count down mode. It can also be seen that when the output 165 is in a one state, the component of current input from the control source 120 increases the pulse rate and hence reduces the time interval in this state. When the output is in the clear state, the component of current input supplied by a positive control source reduces the pulse rate, and hence lengthens the proportional amount of time in the cleared state. If the output is then taken as the normal output 164 of flip-flop 160, this corresponds to an increase above 0.5 in the mark-space ratio. In a similar manner, it can be seen that a negative input from source 120 will result in a reduction below 0.5 of the mark-space ratio. Hence, when the oscillator of this embodiment is viewed as a two terminal entity; that is, an input terminal and an output terminal, it is functionally the same as FIGS. 3 and 4.

Figure 6:
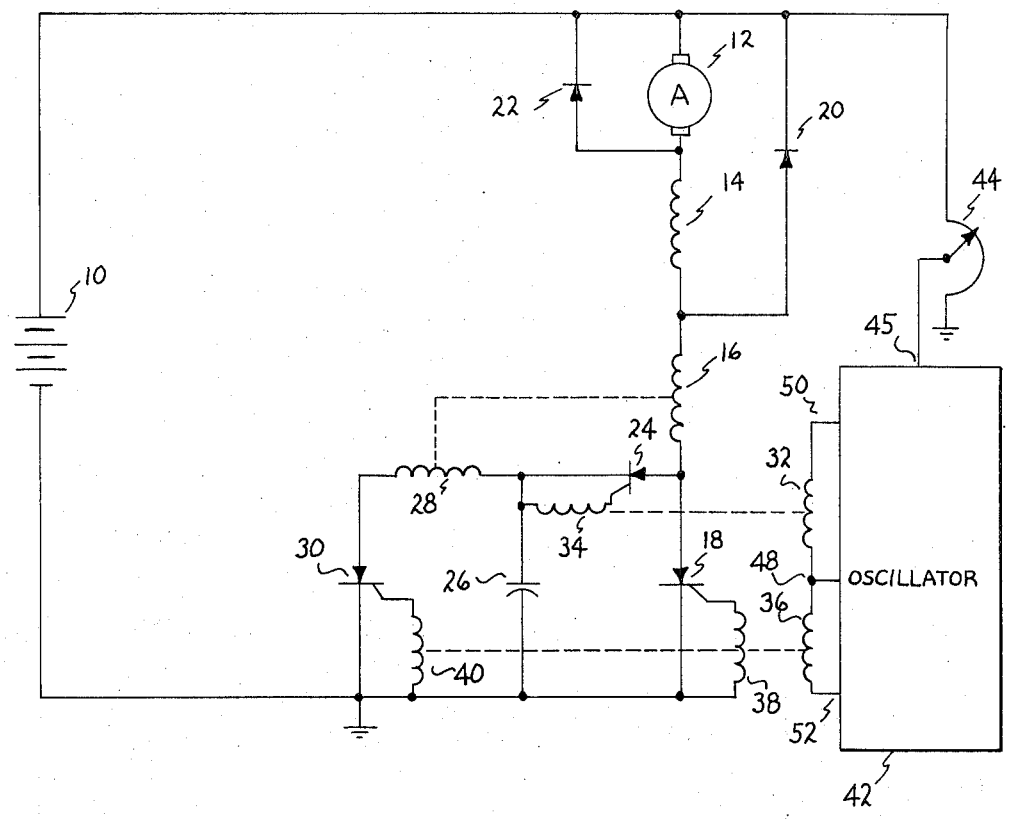

Referring now to FIG. 6, there is shown the employment of the oscillator of the present invention to the control of power to a load, in this case an electrical motor. The circuit of FIG. 6 includes a suitable source of direct current power 10 which is a part of a series circuit comprising an armature 12 and a series field 14 of a d.c. motor, a transformer primary 16, and a power thyristor 18. The motor armature is shunted by a diode 22 which provides a path for armature current flow during braking. The series connection of the armature 12 and the series field 14 are shunted by diode 20 which provides for continuity of motor current flow during the interpulse period. A series circuit comprising a commutating thyristor 24 and a commutating capacitor 26 is connected in parallel to thyristor 18, and a series circuit comprising a transformer secondary 28 and thyristor 30 is connected in parallel to the capacitor 26. Gating signals are provided to thyristor 18 and thyristor 30 from an oscillator circuit 42 by means of a pulse transformer primary winding 36 and pulse transformer secondary windings 38 and 40. Gating signals to the commutating thyristor 24 are provided from the oscillator circuit 42 by means of the pulse transformer primary winding 32 and a pulse transformer secondary winding 38. Oscillator 42 may be any of those described with respect to FIGS. 2 through 5 and exhibiting the characteristics shown in FIG. 1. The output of oscillator 42 in FIG. 6 is applied to the transformer primary winding via leads 50 and 52 (corresponding to leads 50 and 52 of FIG. 2). A potentiometer 44 (corresponding to the source 46 in FIGS. 2 through 4 and 120 in FIG. 5) provides means by which the mark-space ratio of the oscillator 42 can be varied through control of the voltage supplied to the oscillator input terminal 45. When the circuit is first started, the oscillator provides a gating signal to the commutating thyristor 24 to precharge the commutating capacitor 26 positive to the upper terminal. The oscillator then provides gating signals to thyristors 18 and 30 to connect the load to source and to reverse the charge on the commutating capacitor 26 through transformer secondary winding 28 and thyristor 30 resulting in a charge positive to the bottom terminal of the capacitor 26. The oscillator then provides a gating signal to thyristor 24 to connect the reversely charged commutating capacitor 26 in parallel with thyristor 18 reducing the thyristor current to zero and forcing commutation. The motor is then disconnected from the source and inductive energy trapped within the motor maintains a current flow through diode 20 until the next ON period. Each time the thyristor 18 is switched into conduction and then to a blocking state, a pulse of voltage is applied across the motor armature 12 and field 14. Either the frequency or the duration of the pulses can be controlled by the oscillator 42 to regulate the power supplied to the motor. A system such as has just been described is shown in more detail in U. S. Pat. No. 3,656,039, "Direct Current Control Circuit" by C. E. Konrad, assigned to the assignee of the present invention. The suitability of a given drive system is intimately related to the frequency and duration of the voltage pulses, and since these two variables are under control of the oscillator, the importance of the oscillator characteristics is obvious.

While the invention has been explained and described with the aid of particular embodiments thereof, it will be understood that the invention is not limited thereby and that many modifications retaining and utilizing the spirit thereof without departing essentially therefrom will occur to those skilled in the art in applying the invention to specific operating environments and conditions. It is, therefore, contemplated by the appended claims to cover all such modifications which fall within the scope and spirit of the invention.

What is claimed is:

1. A d.c. motor power control circuit of the type including a power switch which is alternately rendered conductive and nonconductive to vary the power supplied to a motor, said control circuit comprising:
   a. means to provide an input signal having a magnitude proportional to the desired motor power;
   b. integrating means to provide an output signal proportional to the time integral of said input signal;
   c. switching means responsive to said output signal wherein said switching means achieves a first state when said output signal reaches a first predetermined value and a second state when said output signal reaches a second predetermined value;
   d. feedback means which adds to said input signal in response to the first state of said switching means and subtracts from said input signal in response to the second state of said switching means; and,
   e. means to interconnect said power switch and said switching means to render said power switch conductive and nonconductive in response to said first and second states respectively of said switching means.

2. The invention in accordance with claim 1 wherein said integrating means is an analog integrator.

3. The invention in accordance with claim 1 wherein said integrating means includes a digital counter.

4. A control circuit for a d.c. load of the type in which the power delivered to the load varies as a function of the percentage of time during which the load is connected to a source of d.c. power comprising:
   a. switching means in circuit with said source and said load, said switching means acting to connect said load to said source when said switching means is in a conducting state and acting to disconnect said load from said source when said switching means is in a nonconducting state, the ratio of time said switching means is conductive to that it is not conducting being defined as a mark-space ratio;
   b. an oscillator circuit control to provide a series of pulses having a variable mark-space ratio, said oscillator circuit including,
      1. means to provide a control signal having a magnitude proportional to a desired mark-space ratio; and,
      2. means responsive to said control signal to vary the frequency of said series of pulses monotonically in a first direction between a mark-space ratio of approximately zero and a prescribed value, and in an opposite direction between said prescribed value and approximately unity by varying both the pulse width and the interpulse period in a selected manner throughout the range of desired mark-space ratios; and, c. means for transmitting said series of pulses from said oscillator circuit to said switching means to render said switching means conductive.

5. The invention in accordance with claim 4 wherein said load is a d.c. motor.

6. The invention in accordance with claim 4 wherein said switching means is a thyristor.

7. The invention in accordance with claim 4 wherein the means responsive to the control signal includes an integrating means.

8. The invention in accordance with claim 7 wherein said integrating means is analog.

9. The invention in accordance with claim 7 wherein said integrating means is digital.

10. A control circuit for a d.c. load comprising:

a. a power switch in circuit with said source and said load, said switch acting to connect said load to said source when said switch is in a conducting state and acting to disconnect said load from said source when said switch is in a nonconducting state, the ratio of time said switch is conductive to that it is not conducting being defined as a mark-space ratio;

b. means to provide an input signal having a magnitude proportional to the desired load power;

c. integrating means to provide an output signal proportional to the time integral of said input signal;

d. switching means responsive to said output signal wherein said switching means achieves a first state when said output signal reaches a first predetermined value and a second state when said output signal reaches a second predetermined value;

e. feedback means which adds to said input signal in response to the first state of said switching means and subtracts from said input signal in response to the second state of said switching means; and, f. means to interconnect said power switch and said switching means to render said power switch conductive and nonconductive in response to said first and second states respectively of said switching means.

11. The invention in accordance with claim 10 wherein said integrating means is analog.

12. The invention in accordance with claim 10 wherein said integrating means is digital.

13. The invention in accordance with claim 10 wherein said power switch is a thyristor.

* * * * *

Disclaimer 3,803,472.—*Charles E. Konrad*, Roanoke, Va. CONTROLLED VARIABLE TIME RATIO CONTROL CIRCUIT. Patent dated Apr. 9, 1974. Disclaimer filed June 13, 1975, by the assignee, *General Electric Company*.

Hereby enters this disclaimer to all claims of said patent.

[*Official Gazette August 5, 1975.*]